April 2, 1957     E. A. KRING     2,787,076
FISH LURE
Filed Jan. 25, 1954
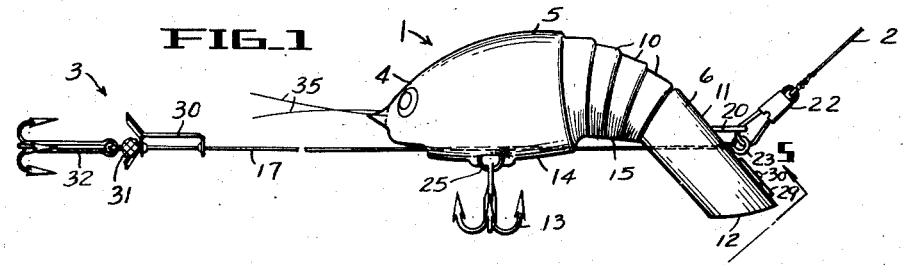
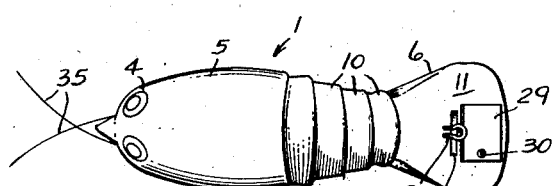
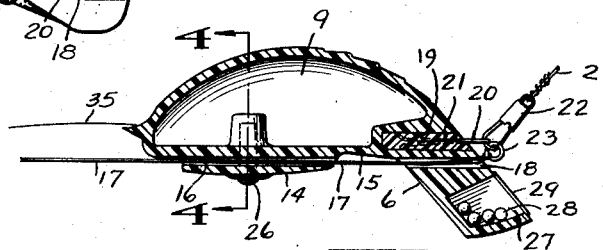
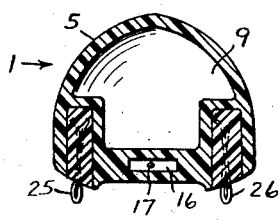
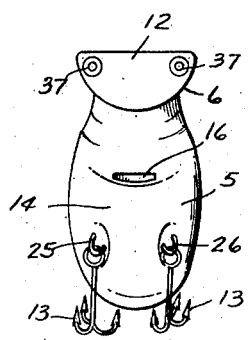
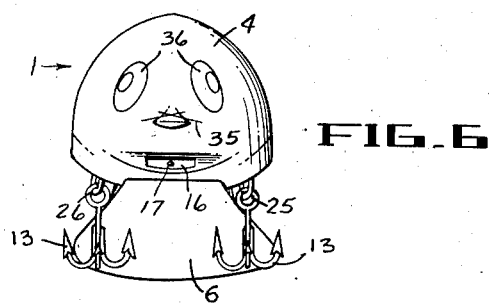
INVENTOR.
EDWARD A. KRING
BY
Boyken, Mohler & Beckley
ATTORNEYS United States Patent Office 2,787,076
Patented Apr. 2, 1957

2,787,076

FISH LURE

Edward A. Kring, Mountain View, Calif., assignor to Kringfisher Company, Mountain View, Calif., a corporation of California Application January 25, 1954, Serial No. 405,687

8 Claims. (Cl. 43—42.16)

The present invention relates primarily to a fish lure of the type employed for bait fishing and more specifically to a lure, or pair of lures, which may combine the function of the usual bait type of lure and a fly lure.

Heretofore it has been customary to provide two different types of fishing gear depending upon whether the user is employing fish bait or a fly. It is one of the objects of the present invention to provide a combination fish bait and fly lure which may be employed with the customary bait casting equipment. For example, fish such as trout which strike at flies and fish such as bass and bluegill which strike at fresh bait may be fished for at the same time. In addition, by the present invention a fly may be cast as far as a bait casting or spinning outfit will cast a plug.

Another object of the invention is the provision of a fish lure which simulates the appearance of a crawfish (crayfish) in general construction and is therefore effective for catching most fish. At the same time the fish lure of the present invention is formed so as to simulate the appearance of a frog when viewed from one angle and to simulate the appearance of a different creature when viewed from another angle. By this construction the effectiveness of the lure is considerably enhanced over those lures which attract only one kind of fish.

Still another object of the invention is the provision of a fish lure arranged so as to provide a swimming action when moving.

Yet another object of the invention is the provision of a fish lure which incorporates means for selectively changing the angle at which the lure is disposed relative to the vertical and also the depth at which the lure is towed.

Another object of the invention is the provision of a main lure similar to a plug which is provided with means for towing a fly, bait, spinner or other auxiliary lure and at the same time prevent fouling of the hook or hooks of the main lure with the draw line of the auxiliary lure.

Other objects and advantages will be seen in the following specification and the drawings wherein:

Fig. 1 is a side elevation of main lure and the auxiliary lure in their proper relative relationship relative to a fishing line connected to the main lure.

Fig. 2 is a top plan view of the main lure.

Fig. 3 is a longitudinal section through the main lure.

Fig. 4 is a transverse section of the main lure as taken along lines 4—4 of Fig. 3.

Fig. 5 is an oblique end elevation of the main lure as seen at the lines 5—5 of Fig. 1.

Fig. 6 is a front elevation of the main lure.

In detail, the invention comprises a main lure generally designated 1, attached to a fishing line 2 and also an auxililary lure generally designated 3 (Fig. 1).

Considering the main lure first in detail, the same comprises a generally elongated hollow body having a head portion 4, a central body portion 5 and a tail 6.

As best seen in Fig. 3 the lure 1 is formed with a relatively large hollow chamber 9 which includes the head portion 4 and the central body portion 5.

The juncture 15 between the tail 6 and the central body portion 5 is formed with a plurality of stepped sections 10 diminishing in girth toward the tail. By this structure the lure assumes the characteristic shape of a crawfish (crayfish), a very popular bait for most fish.

The tail 6 is substantially solid and slants downwardly and rearwardly from the remainder of the body at an angle of about 50° (Figs. 1, 3). As best seen in Fig. 2 said tail flares outwardly toward its end and is provided with a rearwardly and upwardly directed flat face 11. The tail 6 terminates in a generally horizontally extending flat surface 12 (Figs. 1, 5) which is generally semicircular in shape and resembles the head of a creature.

Referring to Figs. 1, 3 it is seen that the belly portion 14 of the lure is spaced slightly downwardly from the juncture 15 that connects the central body portion 5 with the tail. Extending longitudinally through said belly portion is an elongated passageway 16 through which a drawline 17 is adapted to be received. The lateral extent of said passageway 16 is preferably about 25 or 30 times the diameter of the drawline 17 although the exact width will vary with the size of the lure. The important point in this connection is that a considerable amount of sidewise oscillatory movement of the lure relative to the drawline 17 is permitted in a manner that will more fully described later.

In alignment with the passageway 16 is an aperture 18 in the tail 6 of a size sufficient to loosely receive the drawline 17 therethrough (Figs. 1, 3).

At a point spaced slightly upwardly from aperture 18 is a relatively deep recess 19 which opens outwardly of the tail in a rearwardly direction for receiving an eye member 20. The recess which receives the eye member 20 is preferably filled with resin 21 in a liquid state so as to secure the eye member in place when the resin hardens.

The fishing line 2 may be secured to said eye member 20 by the usual safety pin 22 for towing the lure. The drawline 17 is provided with an eye 23 which is also secured to safety pin 22. In this manner both the main lure 1 and the auxiliary lure 3 may be towed from the same line 2.

It will be understood that the main lure 1 is towed with the tail 6 leading in the same manner as a crawfish swims in the water.

Between the opposite ends of passageway 16 and on opposite sides thereof the central body portion 5 is provided with a pair of eyes 25, 26 (Figs. 1, 4, 5, 6) for receiving the usual fish hooks 13 hereinbefore mentioned in connection with Fig. 5. Eyes 25, 26 are secured in the same manner as eye 20.

As best seen in Fig. 1, the length of passageway 16 is predetermined with regard to the size of hooks 13 so that it is impossible for the hooks to catch on the drawline 17 or to catch in the ends of passageway 16. In other words, regardless of how much the hooks 13 swing in relation to the drawline 16 they always remain free.

Adjacent the end of tail 6 the same is provided with an upwardly and rearwardly opening recess 27 which is adapted to receive one or more relatively small weights 28. Swingably mounted on the flat face 11 of tail 6, as by pin 30, is a closure 29 which is adapted to close the recess 27 against outfall of the weights 28 therefrom.

By varying the number or size of weights 28 the buoyancy of the tail 6 may be selectively adjusted so that the lure will float at any desired angle, or, if used as a sinking lure, will be disposed under the water at various angles relative to the horizontal.

An important advantage of the present invention resides in the fact that a combination of fresh bait and fly lure is provided by the tandem arrangement shown in Fig. 1. The fly lure 3 of course may include the usual spinner 30, light reflecting element 31 and the hook 32.

When the combination of lures is towed as seen in Fig. 1 a lifelike oscillatory motion is imparted to both the auxiliary lure 3 and the main lure 1. Contributing to such motion is the fact that the generally upwardly directed flat face 11 of the tail creates a resistance which reduces the equilibrium of the main lure making it unstable and tending to swing it back and forth laterally. Such sidewise oscillation is checked by the drawline 17 each time the latter strikes the longitudinally extending side edges of passageway 16, the auxiliary lure 3 providing a drag for maintaining the drawline taunt at all times.

However, the periodic engagement of the drawline 17 with the sides of passageway 16 also imparts a sidewise oscillation to the drawline 17 itself, resulting in a lifelike sidewise oscillation of the auxiliary lure 3.

Another important advantage of the main lure construction, and especially the shape of the weighted tail 6, resides in the fact that when the tail is adequately weighted, the lure will sink to the bottom of a river, lake or ocean with the weighted tail leading. In such a case the lure may come to rest with the tail engaging the bed of the body of water with the remainder of the lure inclined upwardly therefrom. In such a case it will be apparent that the hooks 13 are free and not subject to becoming entangled.

The lure may be made more lifelike by the provision of outwardly extending antennae 35 on the head 4.

It will be noted that when the lure 1 is viewed from the front it takes on the appearance of a June bug as seen in Fig. 5. Such similarity being further enhanced by painting eyes 36 thereon.

As noted above the froglike appearance of the lure 1 when viewed obliquely from the rear (Fig. 5) considerably enhances the value of the lure when fishing for fish such as trout and bass which like frogs. Eyes 37 may be painted on the flat surface 12 to improve the appearance thereof.

I claim:

1. A fish lure comprising an elongated body having a longitudinally extending open ended passageway therein adapted to receive a drawline therethrough, said body being provided with a tail portion having a fastening element adapted to be secured to a fishing line for towing said lure, said tail portion slanting downwardly from the remainder of said body and provided with an opening for receiving said drawline therethrough.

2. A fish lure comprising an elongated body portion and a tail portion slanting downwardly from said body portion, said body portion being provided with a longitudinally extending open ended passageway adjacent the underside thereof adapted to receive a drawline therethrough for towing a second lure thereby, and a fastening element adjacent said tail portion for securement to a fishing line, said tail portion having an aperture therein for receiving said drawline therethrough for securement to said fishing line.

3. A fish lure comprising an elongated body portion and a tail portion slanting downwardly from said body portion, said body portion being provided with a longitudinally extending open ended passageway adjacent the underside thereof adapted to receive a drawline therethrough for towing a second lure thereby, and a fastening element adjacent said tail portion for securement to a fishing line, said tail portion having an aperture therein for receiving said drawline therethrough for securement to said fishing line, said passageway being relatively wide in a direction laterally of said drawline to permit horizontal oscillation of said lure relative to said drawline while said second lure is being towed.

4. A fish lure comprising an elongated body having a longitudinally extending open ended passageway therein adapted to receive a drawline therethrough, said body being provided with a tail portion having a fastening element adapted to be secured to a fishing line for towing said lure, said tail portion slanting downwardly from the remainder of said body and provided with an opening for receiving said drawline therethrough, and means on said body for securing a hook thereto, said means being positioned intermediate the ends of said passageway to prevent fouling of such hook with said drawline.

5. A fish lure comprising an elongated body portion and a tail portion slanting downwardly from said body portion, said body portion being provided with a longitudinally extending open ended passageway adjacent the underside thereof adapted to receive a drawline therethrough for towing a second lure thereby, and a fastening element adjacent said tail portion for securement to a fishing line, said tail portion having an aperture therein for receiving said drawline therethrough for securement to said fishing line, means on said body for securing a hook thereto, said means being positioned about centrally between the open ends of said passageway to prevent fouling of said hook with said drawline.

6. In combination, a first relatively large lure having an elongated body portion and a tail portion, a second lure spaced rearwardly of said first lure relative to the direction of towing, a fastening element on the forwardly facing side of said tail adapted to be secured to a fishing line for towing said first lure with its tail portion leading, said body portion having a longtiudinal extending open ended passageway and a drawline passing through said passageway, said tail being provided with an aperture for receiving said drawline therethrough for connecting one end of the same to said fishing line adjacent said element, the opposite end of said drawline being secured to said second lure.

7. A fish lure comprising an elongated hollow body having a tail portion slanting downwardly relative to the remainder of said body, said tail portion being formed to provide a recess therein adapted to receive a weight for reducing the buoyancy of said portion, and a closure for said recess for retaining said weight in said recess, said body being provided with a hook adjacent the end of said body opposite said tail portion and depending from the underside thereof whereby said hooks are spaced above the bed of a body of water when said tail is weighted and engaging said bed with the remainder of said body slanting upwardly therefrom.

8. A fish lure comprising an elongated body including a tail portion slanting downwardly therefrom and provided with a fastening element adapted to be secured to a fishing line for towing said lure, said body and said tail porton being formed to provide a relatively wide longitudinally extending passageway adapted to receive a drawline therethrough whereby said drawline may be fastened at one end to said fastening element and at its other end to a second lure.

References Cited in the file of this patent

UNITED STATES PATENTS

| | | |
|---|---|---|
| 1,297,354 | Jay | Mar. 18, 1919 |
| 1,313,567 | Ulrich | Aug. 19, 1919 |
| 1,878,015 | Steffensen | Sept. 20, 1932 |
| 2,218,280 | Deering | Oct. 15, 1940 |
| 2,482,648 | Brandt | Sept. 20, 1949 |
| 2,593,461 | Jones | Apr. 22, 1952 |
| 2,593,792 | Reckler | Apr. 22, 1952 |
| 2,596,201 | Bocchino | May 13, 1952 |
| 2,611,207 | Pond | Sept. 23, 1952 |